US012683782B2

(12) United States Patent
Gan et al.

(10) Patent No.: US 12,683,782 B2
(45) Date of Patent: Jul. 14, 2026

(54) MUTUAL MULTI-FACTOR AUTHENTICATION TECHNOLOGY

(71) Applicant: KYNDRYL, INC., New York, NY (US)

(72) Inventors: Seng Chai Gan, Ashburn, VA (US);
Shikhar Kwatra, San Jose, CA (US);
Nadiya Kochura, Bolton, MA (US);
Mauro Marzorati, Lutz, FL (US)

(73) Assignee: Kyndryl, Inc., New York, NY (US)

( * ) Notice: Subject to any disclaimer, the term of this patent is extended or adjusted under 35 U.S.C. 154(b) by 904 days.

(21) Appl. No.: 17/123,245

(22) Filed: Dec. 16, 2020

(65) Prior Publication Data

US 2022/0191027 A1     Jun. 16, 2022

(51) Int. Cl.
*H04L 9/32* (2006.01)
*G06N 3/08* (2023.01)
*H04L 9/08* (2006.01)
*H04L 12/18* (2006.01)

(52) U.S. Cl.
CPC .............. *H04L 9/3213* (2013.01); *G06N 3/08* (2013.01); *H04L 9/0825* (2013.01); *H04L 12/1822* (2013.01); *H04L 12/1831* (2013.01)

(58) Field of Classification Search
CPC . H04L 9/3213; H04L 9/0825; H04L 12/1822; H04L 12/1831; H04L 12/1818;
(Continued)

(56) References Cited

U.S. PATENT DOCUMENTS 5,535,276 A * 7/1996 Ganesan ............... H04L 9/0825
380/46
7,747,850 B1 6/2010 Gordon
(Continued)

FOREIGN PATENT DOCUMENTS

AU      2014239871 A1 * 4/2015
BR      112021011464 A2 * 8/2021 .......... G06Q 10/107
(Continued)

OTHER PUBLICATIONS

Wei-Bin Lee, A Photo Certificate—A Framework for Generating Visualized Public Key Certificates , Journal of Electronic Science and Technology, vol. 9, No. 4, Dec. 2011 , 6 pages (Year: 2011).*
(Continued)

*Primary Examiner* — Shahriar Zarrineh
(74) *Attorney, Agent, or Firm* — Erik Swanson; Andrew M. Calderon; Calderon Safran & Wright P.C.

(57) ABSTRACT
Computer software that stores information relating to a planned in-person meeting between a first user and a second user. The information includes a meeting time, a meeting location, and, for each of the first user and the second user: (i) a communications identifier associated with a device of the respective user, and (ii) a token identified by the respective user for the meeting. The computer software, in response to receiving an indication that the device of the first user is located at the meeting location at the meeting time, sends, to the device of the first user: (i) the communications identifier associated with the device of the second user, and (ii) the token identified by the second user for the meeting.

20 Claims, 8 Drawing Sheets

(58) Field of Classification Search
CPC ........... H04L 2463/082; H04L 63/0869; H04L
9/3247; G06N 3/08; G06N 3/0454; G06N
3/0472
See application file for complete search history.

(56) References Cited

U.S. PATENT DOCUMENTS

| | | | |
|---|---|---|---|
| 7,877,082 B2 | 1/2011 | Eagle | |
| 7,984,378 B1* | 7/2011 | Atkins | G06Q 10/109 |
| | | | 715/733 |
| 8,825,767 B2 | 9/2014 | Sivavakeesar | |
| 9,380,053 B1 | 6/2016 | Behnken | |
| 9,867,021 B1* | 1/2018 | Kime | H04W 12/02 |
| 10,417,613 B1* | 9/2019 | Brisebois | G06F 21/554 |
| 10,958,457 B1* | 3/2021 | Davis | H04L 12/2803 |
| 10,984,225 B1* | 4/2021 | Ghosh | G06V 40/161 |
| 11,093,912 B1* | 8/2021 | Fakhraie | H04L 63/0853 |
| 11,296,893 B2* | 4/2022 | Flokos | H04L 63/0823 |
| 2003/0161475 A1* | 8/2003 | Crumly | G09C 5/00 |
| | | | 713/185 |
| 2004/0085259 A1* | 5/2004 | Tarlton | H04M 1/72427 |
| | | | 345/2.3 |
| 2004/0093290 A1* | 5/2004 | Doss | G06Q 10/1095 |
| | | | 705/35 |
| 2005/0143097 A1* | 6/2005 | Wilson | H04W 64/00 |
| | | | 455/456.3 |
| 2005/0154911 A1 | 7/2005 | Schneider | |
| 2006/0227047 A1* | 10/2006 | Rosenberg | G01S 5/0054 |
| | | | 342/357.55 |
| 2008/0177611 A1* | 7/2008 | Sommers | G06Q 10/1095 |
| | | | 705/7.19 |
| 2009/0055238 A1* | 2/2009 | Baryshnikov | G06Q 10/1095 |
| | | | 705/7.22 |
| 2009/0070678 A1* | 3/2009 | Landar | G06Q 10/109 |
| | | | 715/733 |
| 2009/0113530 A1* | 4/2009 | Brainard | G06F 21/31 |
| | | | 726/5 |
| 2009/0172097 A1* | 7/2009 | O'Sullivan | G06Q 10/109 |
| | | | 709/204 |
| 2009/0228707 A1* | 9/2009 | Linsky | H04L 63/1475 |
| | | | 380/283 |
| 2009/0327227 A1* | 12/2009 | Chakra | G06Q 10/10 |
| | | | 709/204 |
| 2010/0017371 A1* | 1/2010 | Whalin | G06Q 10/06 |
| | | | 707/E17.014 |
| 2010/0110313 A1* | 5/2010 | Souders | H04M 1/72403 |
| | | | 348/836 |
| 2011/0028132 A1* | 2/2011 | Bos | H04W 4/029 |
| | | | 455/414.2 |
| 2013/0212494 A1* | 8/2013 | Heiferman | G06Q 30/02 |
| | | | 715/753 |
| 2013/0226696 A1* | 8/2013 | Cook | H04W 4/21 |
| | | | 705/14.49 |
| 2013/0254396 A1 | 9/2013 | Robertson | |
| 2013/0263020 A1* | 10/2013 | Heiferman | H04L 12/1818 |
| | | | 715/753 |
| 2014/0379404 A1* | 12/2014 | Bastide | G06Q 10/1095 |
| | | | 705/7.19 |
| 2015/0063656 A1* | 3/2015 | Poder | H04L 9/3231 |
| | | | 382/118 |
| 2015/0169946 A1* | 6/2015 | Needleman | G06F 16/583 |
| | | | 382/118 |
| 2015/0332105 A1* | 11/2015 | Waters | H04L 9/3231 |
| | | | 382/116 |
| 2016/0027079 A1* | 1/2016 | Schoeffler | H04L 63/12 |
| | | | 705/325 |
| 2016/0055324 A1* | 2/2016 | Agarwal | G06F 21/31 |
| | | | 726/17 |
| 2016/0364696 A1* | 12/2016 | Balasubramanian | |
| | | | G06Q 10/1095 |
| 2016/0366079 A1* | 12/2016 | Razavian | H04L 51/18 |
| 2017/0061438 A1* | 3/2017 | Patel | G06Q 20/326 |
| 2017/0090850 A1* | 3/2017 | Amrhein | G06F 3/04842 |

| | | | |
|---|---|---|---|
| 2017/0222964 A1* | 8/2017 | Hoffman | H04L 51/222 |
| 2017/0250974 A1* | 8/2017 | Antonyraj | H04W 12/50 |
| 2018/0165656 A1* | 6/2018 | Tessler | G06Q 10/10 |
| 2018/0165781 A1* | 6/2018 | Rodriguez | G06Q 40/00 |
| 2018/0293318 A1* | 10/2018 | Ghassemi | G06F 16/9537 |
| 2019/0019155 A1* | 1/2019 | Arora | G06Q 10/107 |
| 2019/0068477 A1* | 2/2019 | Faulkner | H04L 41/046 |
| 2019/0121813 A1* | 4/2019 | Galebach | G06Q 10/04 |
| 2019/0139002 A1* | 5/2019 | Kumar | G06Q 10/1095 |
| 2019/0172111 A1 | 6/2019 | Schoeffler | |
| 2019/0182616 A1* | 6/2019 | Kamath | H04L 67/535 |
| 2019/0229890 A1* | 7/2019 | Brehmer | H04L 9/088 |
| 2019/0362317 A1* | 11/2019 | Rogynskyy | G06N 3/08 |
| 2020/0014691 A1* | 1/2020 | Ortiz | H04L 9/3234 |
| 2020/0068362 A1 | 2/2020 | Nordstrom | |
| 2020/0076784 A1* | 3/2020 | Renner | H04L 63/08 |
| 2020/0228941 A1* | 7/2020 | Angapova | H04L 51/52 |
| 2020/0233389 A1* | 7/2020 | Ma | H04L 9/3247 |
| 2020/0265526 A1* | 8/2020 | Ogunsusi | G06Q 50/265 |
| 2020/0279279 A1* | 9/2020 | Chaudhuri | G06N 5/04 |
| 2020/0351265 A1* | 11/2020 | Srinath | H04N 7/152 |
| 2020/0374600 A1* | 11/2020 | Xu | G06V 20/46 |
| 2020/0388403 A1* | 12/2020 | Boulos | G16H 50/20 |
| 2021/0067350 A1* | 3/2021 | McClintock | H04L 9/3268 |
| 2021/0090063 A1* | 3/2021 | Ahmed | G06Q 20/3224 |
| 2021/0105147 A1* | 4/2021 | Waugh | H04L 67/535 |
| 2021/0109938 A1* | 4/2021 | LaPoff | G06F 16/9535 |
| 2021/0118077 A1* | 4/2021 | Kuta | G06Q 20/12 |
| 2021/0357875 A1* | 11/2021 | VanBlon | G06Q 10/1095 |
| 2021/0406554 A1* | 12/2021 | Choi | G06N 3/08 |
| 2022/0046009 A1* | 2/2022 | Bronstein | H04L 63/0861 |
| 2022/0121932 A1* | 4/2022 | Kalarot | G06K 9/6253 |
| 2022/0138473 A1* | 5/2022 | Kwatra | G06V 10/82 |
| | | | 382/190 |
| 2022/0172080 A1* | 6/2022 | Chaudhury | G06N 3/08 |
| 2022/0369080 A1* | 11/2022 | Kime | H04W 12/02 |

FOREIGN PATENT DOCUMENTS

| | | | | | |
|---|---|---|---|---|---|
| CA | 2710684 A1 | * | 1/2011 | ........ | G01C 21/3438 |
| CN | 103646375 A | * | 3/2014 | | |
| CN | 106059747 A | * | 10/2016 | | |
| CN | 103560889 B | | 1/2017 | | |
| CN | 107508796 A | * | 12/2017 | ........ | H04L 63/0428 |
| CN | 107766797 A | | 3/2018 | | |
| CN | 105264864 B | * | 6/2019 | ........... | H04L 63/08 |
| CN | 106897634 B | * | 6/2020 | ........ | G06F 21/6209 |
| CN | 108596024 B | * | 5/2021 | ........ | G06K 9/00281 |
| CN | 113485567 A | * | 10/2021 | | |
| CN | 114782240 A | * | 7/2022 | | |
| CN | 110334805 B | * | 10/2022 | ........... | G06N 3/084 |
| EP | 3044943 B1 | | 7/2016 | | |
| IN | 201400342 I4 | * | 7/2016 | | |
| JP | 2002055576 A | * | 2/2002 | | |
| JP | 2004242029 A | * | 8/2004 | | |
| KR | 20100137331 A | * | 12/2010 | | |
| KR | 20110071201 A | * | 6/2011 | | |
| KR | 20110126124 A | * | 11/2011 | | |
| WO | WO-2008020663 A1 | * | 2/2008 | ....... | G06F 17/30265 |
| WO | 2008143652 A1 | | 11/2008 | | |
| WO | WO-2009143713 A1 | * | 12/2009 | ........... | H04L 9/083 |
| WO | WO-2011149563 A1 | * | 12/2011 | ........... | G06Q 10/10 |
| WO | WO-2014035696 A2 | * | 3/2014 | ........... | G06F 21/31 |
| WO | WO-2014138753 A2 | * | 9/2014 | ........... | G06F 17/16 |
| WO | 2015179922 A1 | | 12/2015 | | |
| WO | WO-2017204813 A1 | * | 11/2017 | ........... | G06F 21/31 |
| WO | WO-2019162563 A1 | * | 8/2019 | ........... | H04L 63/08 |
| WO | WO-2020244777 A1 | * | 12/2020 | ........... | G06F 18/213 |
| WO | WO-2021097204 A1 | * | 5/2021 | ........... | G06Q 10/02 |

OTHER PUBLICATIONS

Norishige Morimoto, Framework of Trustworthy Digital Photo Management System, S&T's 2001 PICS Conference Proceedings, 4 pages (Year: 2001).*
Rameenabda, "Image2StyleGAN: How to Embed Images Into the StyleGAN Latent Space?" Subjects: Computer Vision and Pattern

(56) References Cited

OTHER PUBLICATIONS

Recognition (cs.CV); arXiv:1904.03189v2 [cs.CV] Sep. 3, 2019, 23 pages (Year: 2019).*

"X.509 Reference", Cryptography, retrieved from the Internet on Sep. 21, 2020, 55 pages, <https://cryptography.io/en/latest/x509/reference/>.

Aljanabi, Mohammed Abdulameer, Research Gate, "What is the popular face recognition algorithm?", Asked Dec. 20, 2017, 3 pages, <https://www.researchgate.net/post/What_is_the_popular_face_recognition_algorithm>.

Balfanz et al., "Talking To Strangers: Authentication in Ad-Hoc Wireless Networks", published in NDSS 2002, 16 pages.

Kim et al., "RelationGrams: Tie-Strength Visualization for User-Controlled Online Identity Authentication", CyLab, Carnegie Mellon University, Pittsburgh, PA, CMU-CyLab-11-014, Feb. 10, 2011, 11 pages.

Mell et al., "The NIST Definition of Cloud Computing", Recommendations of the National Institute of Standards and Technology, Special Publication 800-145, Sep. 2011, 7 pages.

* cited by examiner

250

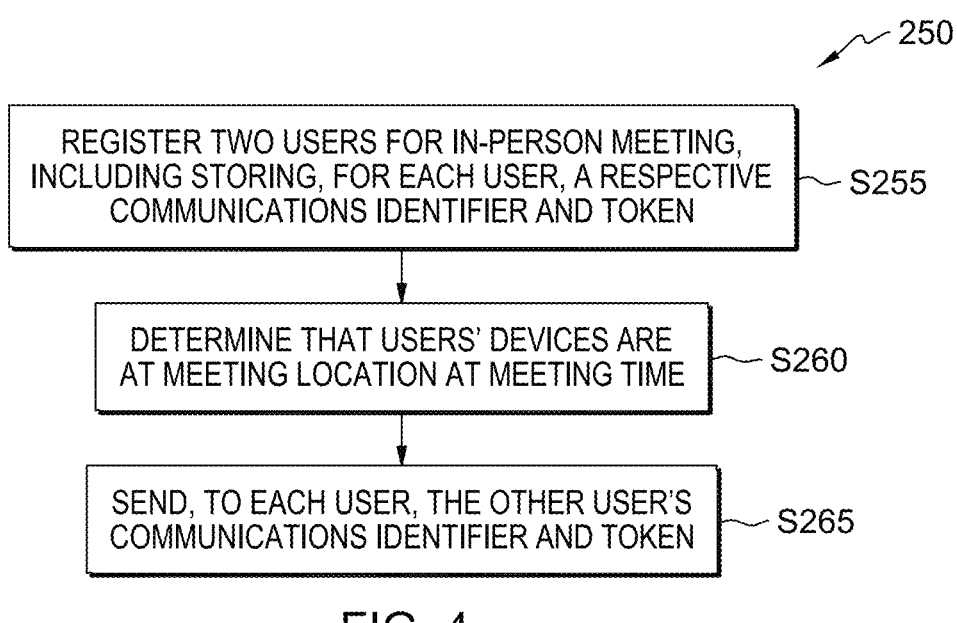

REGISTER TWO USERS FOR IN-PERSON MEETING, INCLUDING STORING, FOR EACH USER, A RESPECTIVE COMMUNICATIONS IDENTIFIER AND TOKEN — S255

DETERMINE THAT USERS' DEVICES ARE AT MEETING LOCATION AT MEETING TIME — S260

SEND, TO EACH USER, THE OTHER USER'S COMMUNICATIONS IDENTIFIER AND TOKEN — S265

FIG. 4

AUTHENTICATION PROCESSING  96

PROGRAM   300

I/O MOD
355

REGISTRATION MOD
360

GEOLOCATION MOD
365

IMAGE PROCESSING MOD
370

FIG. 5

REGISTER FOR IN-PERSON MEETING — S455

NOTIFY OF ARRIVAL AT MEETING LOCATION AT MEETING TIME — S460

RECEIVE OTHER USER'S COMMUNICATIONS IDENTIFIER AND TOKEN — S465

AUTHENTICATE OTHER USER'S DEVICE USING COMMUNICATIONS IDENTIFIER — S470

COMMUNICATE OTHER USER'S TOKEN TO OTHER USER — S475

COMPUTING DEVICE   54A

PROGRAM   500

I/O MOD 555

GEOLOCATION MOD 560

AUTHENTICATION MOD 565

CAMERA MOD 570

600
604
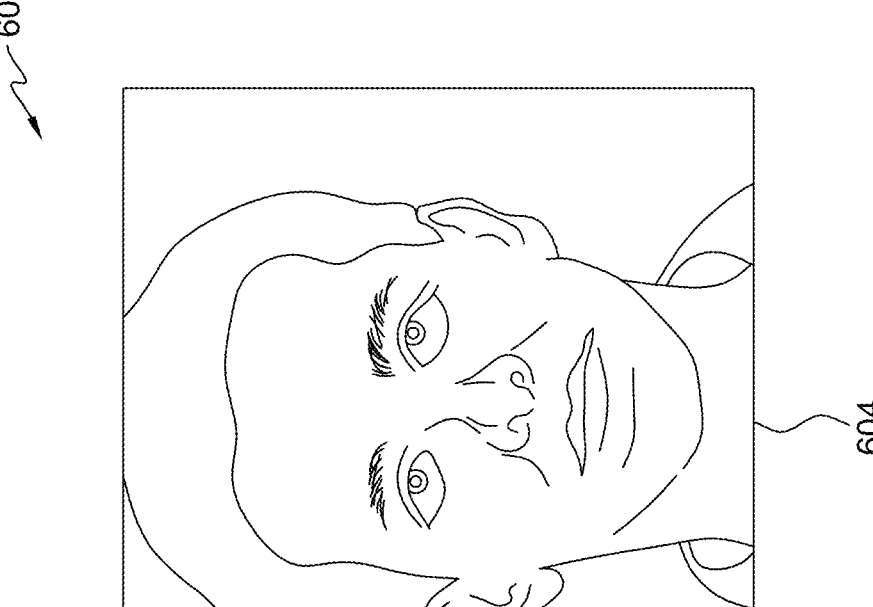
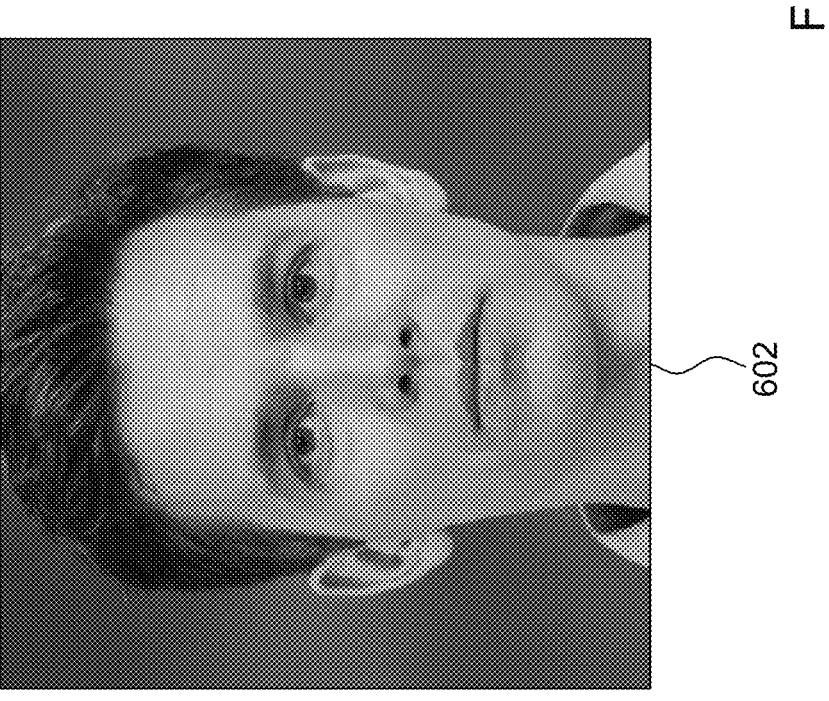
602
FIG. 8

MUTUAL MULTI-FACTOR AUTHENTICATION TECHNOLOGY

BACKGROUND

The present invention relates generally to the field of authentication technology, and more particularly to authentication technology for mutual multi-factor authentication.

Authentication technology generally includes electronic tools that can be used to identify people with a certain level of confidence. The factors via which a person can be authenticated generally fall into three categories: (i) knowledge factors, or something the person knows, (ii) ownership factors, or something the person has, and (iii) inherence factors, or something the person is or does. Multi-factor authentication, which requires multiple pieces of evidence—and many times, evidence covering multiple factors—can be a required part of facilitating transactions and/or communications between people who do not otherwise know each other.

SUMMARY

According to an aspect of the present invention, there is a method, computer program product and/or system that performs the following operations (not necessarily in the following order): storing information relating to a planned in-person meeting between a first user and a second user, the information including a meeting time, a meeting location, and, for each of the first user and the second user: (i) a communications identifier associated with a device of the respective user, and (ii) a token identified by the respective user for the meeting; in response to receiving an indication that the device of the first user is located at the meeting location at the meeting time, sending, to the device of the first user: (i) the communications identifier associated with the device of the second user, and (ii) the token identified by the second user for the meeting; and in response to receiving an indication that the device of the second user is located at the meeting location at the meeting time, sending, to the device of the second user: (i) the communications identifier associated with the device of the first user, and (ii) the token identified by the first user for the meeting.

BRIEF DESCRIPTION OF THE DRAWINGS

FIG. 4 is a flowchart showing a first method performed, at least in part, by the first embodiment system;

FIG. 5 is a block diagram showing a machine logic (for example, software) portion of the first embodiment system;

FIG. 8 is a diagram depicting a digital photograph and a generated portrait image corresponding to the digital photograph, according to some embodiments of the present invention;

DETAILED DESCRIPTION

Figure 1:
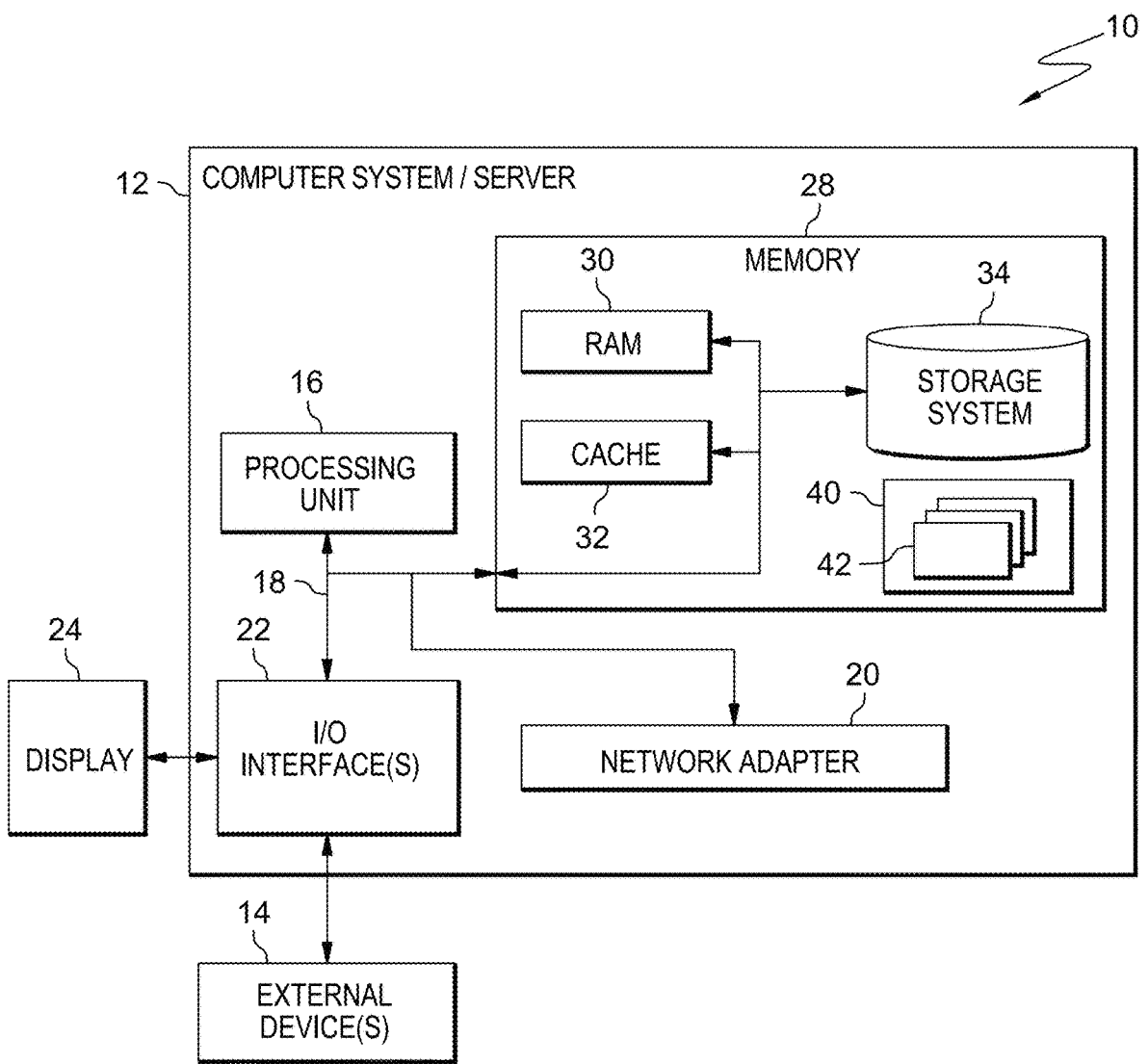
FIG. 1 depicts a cloud computing node used in a first embodiment of a system, according to the present invention.

In the field of authentication technology, many existing solutions focus on authenticating whether an online user is the same as an in-person user, but not whether an in-person user is the same as an online user. In other words, existing methods do not authenticate whether physical people interacting with each other in the "real world" are the same people who have been interacting with each other in the digital world. Various embodiments of the present invention address these deficiencies by providing mutual/symmetric authentication of individuals for an in-person meeting, using a combination of digital (e.g., device identifiers, public key encryption) and physical/visual (e.g., photographs/images/memorized tokens) methods. Various embodiments also employ Generative Adversarial Networks (GANs) to leverage the innate abilities of humans to determine whether two images of a face represent the same person, and to add computational complexity.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
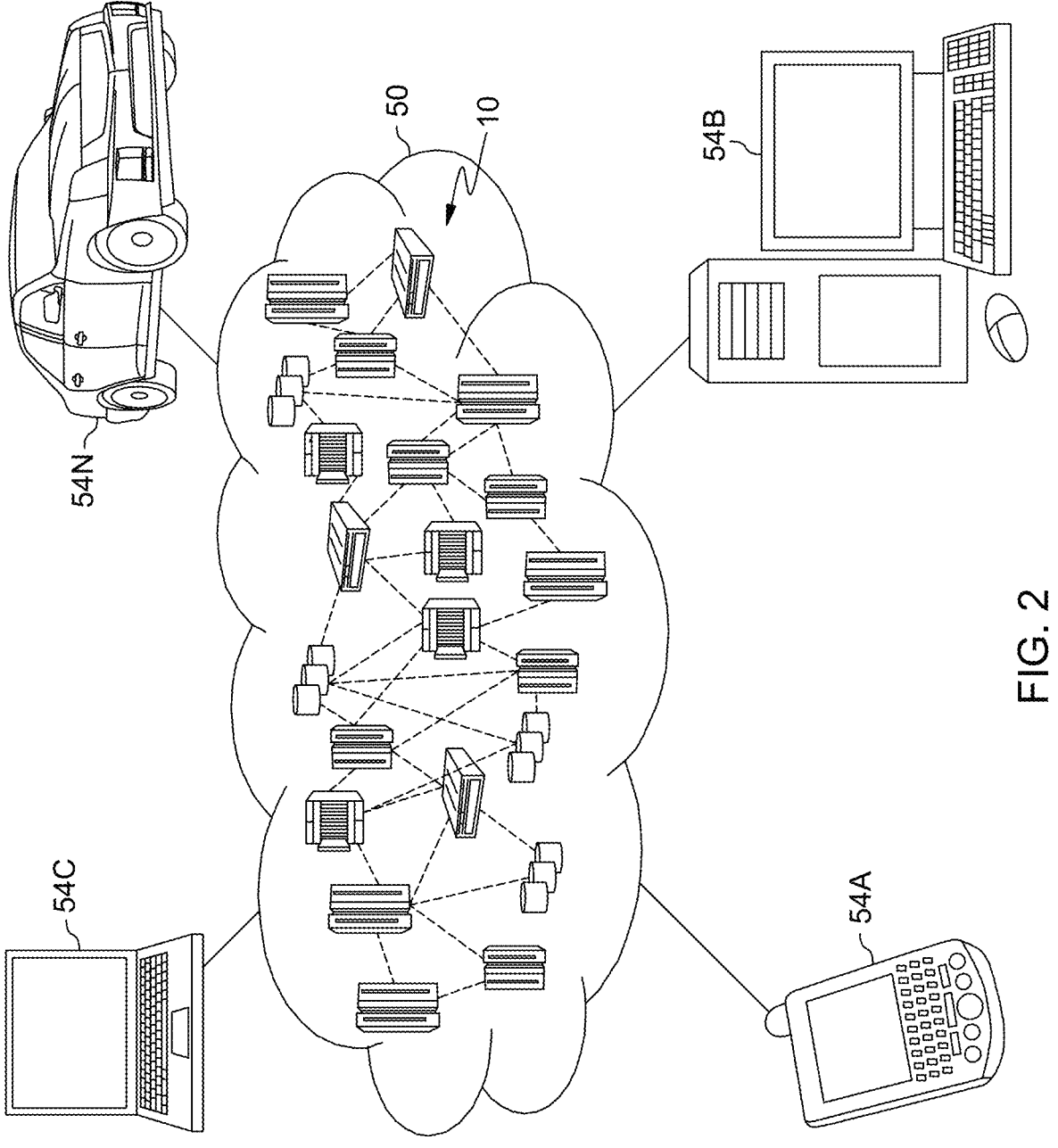
FIG. 2 depicts an embodiment of a cloud computing environment (also called the "first embodiment system"), according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA), cellular telephone, or mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
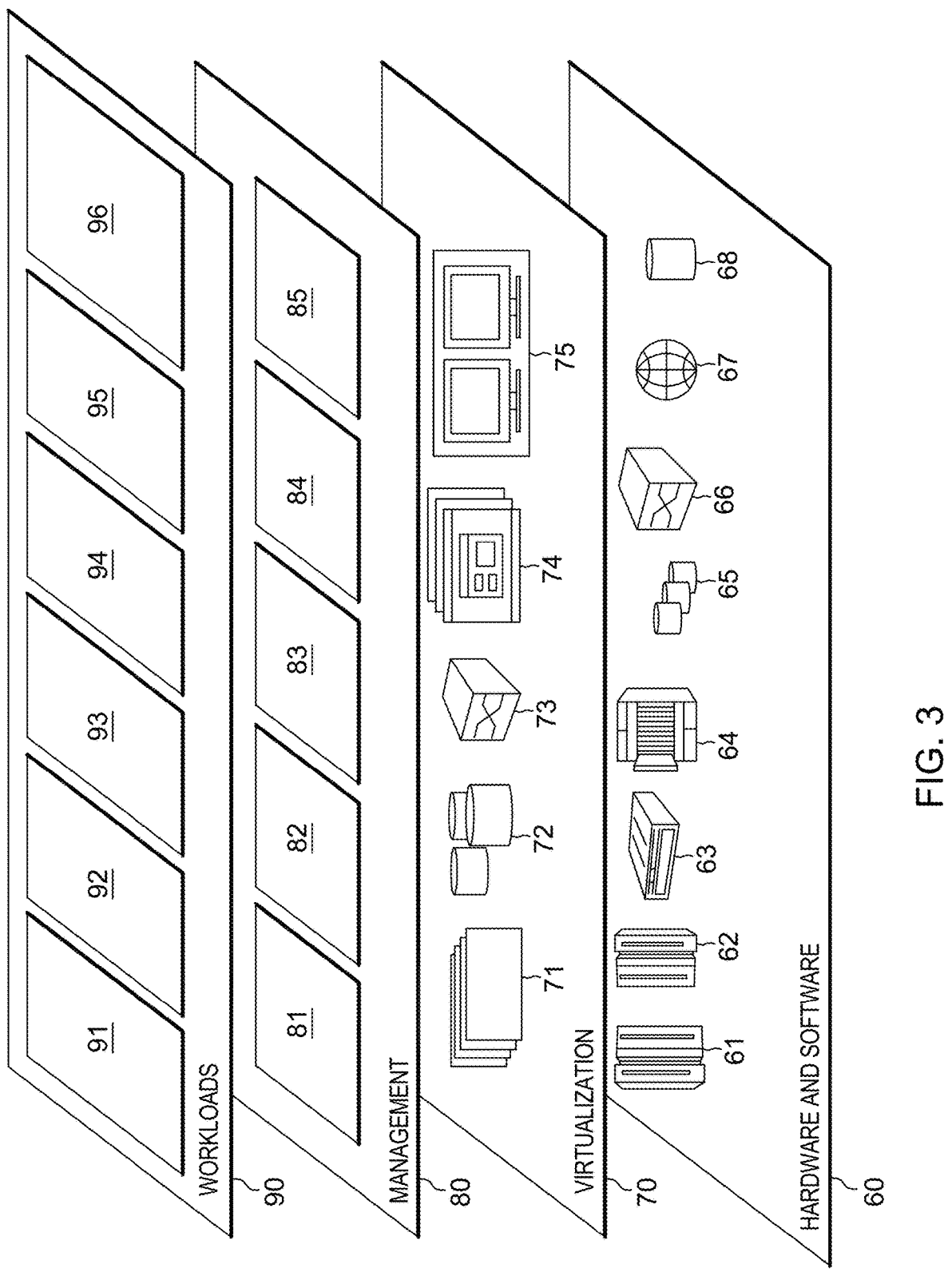
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication processing 96, as will be discussed in detail, below, in the following sub-sections of this Detailed Description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 6:
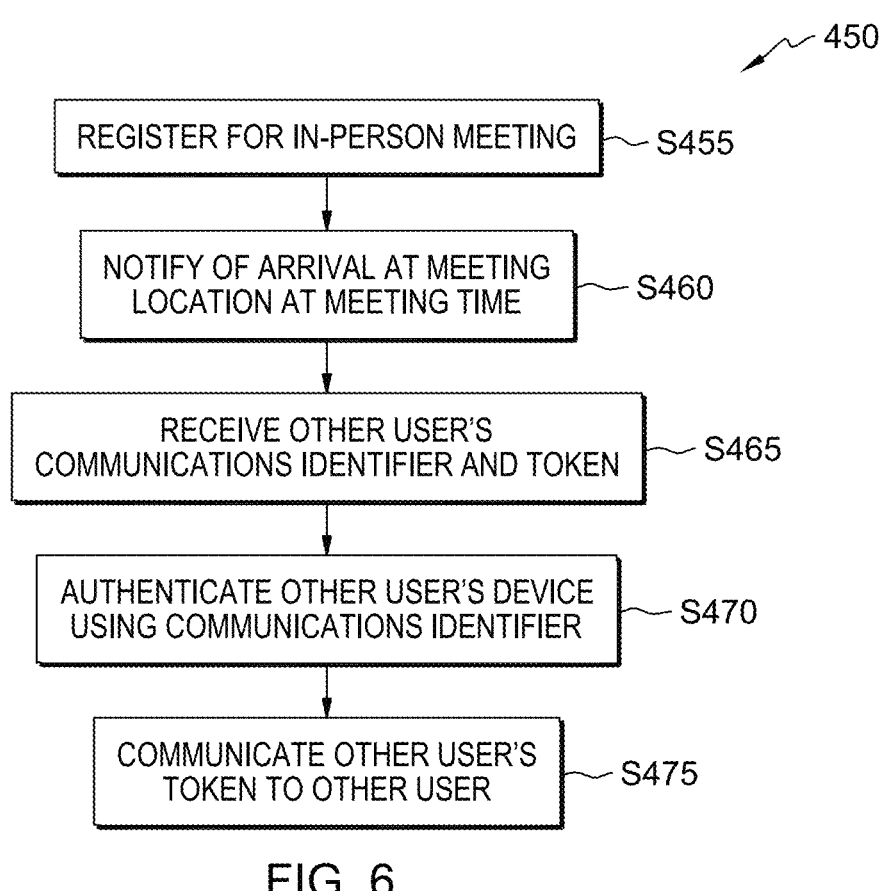
FIG. 6 is a flowchart showing a second method performed, at least in part, by the first embodiment system.
Figure 7:
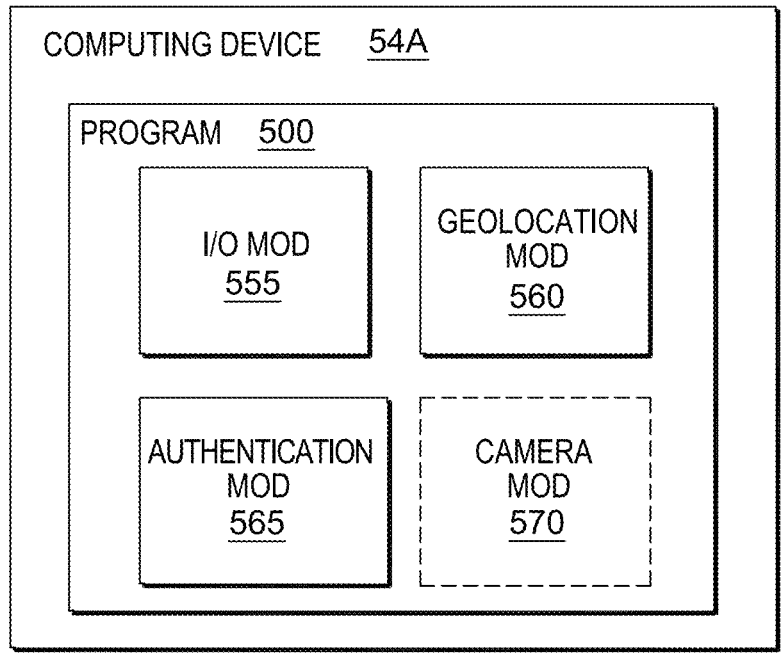
FIG. 7 is a block diagram showing another machine logic (for example, software) portion of the first embodiment system.

FIG. 4 shows flowchart 250 depicting a computer-implemented method according to the present invention, and FIG. 5 shows program 300 for performing at least some of the method operations of flowchart 250, where program 300 may be stored in authentication processing 96 of the first embodiment system (see FIG. 3). FIG. 6 shows flowchart 450 depicting another computer-implemented method according to the present invention, and FIG. 7 shows program 500 for performing at least some of the method operations of flowchart 450, where program 500 may be stored in computing device 54A of the first embodiment system (see FIG. 2). These methods and associated software will now be discussed, over the course of the following paragraphs, with reference to FIGS. 4 and 6 for the method operation blocks and FIGS. 5 and 7 for the software blocks.

Generally speaking, in this example embodiment (also referred to in this sub-section as the "present embodiment," the "present example," the "present example embodiment," and the like), program 300 represents a server-side authentication system and program 500 represents a client-side program that communicates with the server-side authentication system to authenticate a user of computing device 54A and a user of another computing device (not depicted) for an in-person meeting, where the operations performed by program 500 are also representative of operations that may be performed by a program on the other computing device in completing such authentication. It should be noted that this example embodiment is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

In this example, the users of computing device 54A and the other computing device are named "Thomas" and "Watson," respectively, and they are business contacts who are planning to meet at a business conference to deliver, from Thomas to Watson, a product (specifications for a state-of-the art computer chip) that Thomas is selling to Watson. Thomas and Watson have corresponded digitally but have not yet met in person, and thus they plan on using the authentication system of program 300, and corresponding client authentication applications (e.g., program 500) on their respective mobile computing devices (also referred to as "mobile communications devices," "mobile devices," "devices," and the like), to authenticate each other's identity for their meeting. Thomas and Watson have selected this particular authentication system because it provides for both digital authentication and physical/visual authentication, and will help ensure that Thomas transfers the product to the right person (Watson), and that Watson receives the product from the right person (Thomas), as the product is contained in a generic envelope that could be confused for another envelope, particularly at the business conference where many such envelopes may be being exchanged.

Referring first to FIG. 4, processing begins at operation S255, where registration module ("mod") 360 (see FIG. 5) registers the two users for the in-person meeting. In this example, the registration is initiated via requests from the corresponding client authentication applications (or "apps") on Thomas and Watson's respective mobile devices, received by I/O mod 355 of program 300. The requests will be discussed in further detail below with respect to flowchart 450 and program 500 of client device 54A.

To register the users for the meeting, registration mod 360 collects two types of registration information: information about the meeting and information about the users participating in the meeting. The information about the meeting (or "meeting information") may be any type of information that can be used to verify that the users are present at the meeting location at the meeting time. For example, on a basic level, the meeting information may include the meeting time and the meeting location, expressed as specific values or as ranges, depending on what has been agreed by the users. For example, in the present embodiment, Thomas and Watson agree to meet at 3:00 PM on Wednesday, Oct. 28, 2020, in Conference Room A of Conference Center Y, the venue for the aforementioned business conference. Thomas and Watson also agree on an acceptable variance of 30 minutes before or after the meeting, and on an acceptable distance of within 30 feet of Conference Room A, verifiable via Global Positioning Satellite (GPS) or other locating technology, to account for schedule changes and/or conference room conflicts. Other examples of meeting information include, but are not limited to: Wi-Fi SSID or other network-related information, conference attendance credentials, and/or physical markers available for scanning or photographing at a particular location, such as QR Codes, or the like. (Note: the term "QR Code" may be subject to trademark rights in various jurisdictions throughout the world and is used here only in reference to the products or services properly denominated by the mark to the extent that such trademark rights may exist.)

The information about the users participating in the meeting (or "user information") generally includes two sub-types of information: information that can be used to digitally authenticate the users, and information that can be used to physically (such as visually or audibly) authenticate the users. The information that can be used to digitally authenticate the users (or "digital authentication information") may include any information that can be used by a computer to verify that a user is who the user says they are. For example, in the present example embodiment, the digital authentication information includes a unique communications identifier—specifically, a Bluetooth™ ID (or Bluetooth™ "address")—for each user's respective mobile computing device. Other examples of digital authentication information include, but are not limited to: other unique device identifiers, such as an Internet Protocol (IP) address, a Media Access Control (MAC) address, or a serial number; user account identifiers, such as a username, an email address, or a user profile; digital artifacts such as security keys; biometric information, such as fingerprint information, facial recognition information, and handwriting samples (provided, of course, with the consent of the respective users, for the limited purpose of authentication, and with appropriate digital protections in place); and/or digital knowledge tests, such as security questions. (Note: the term "Bluetooth" may be subject to trademark rights in various jurisdictions throughout the world and is used here only in reference to the products or services properly denominated by the mark to the extent that such trademark rights may exist.)

Information that can be used to physically authenticate the users (also referred to as "physical authentication information" or a "token") generally includes any information that a user can observe using one or more of the five senses. Stated another way, the physical authentication information is not necessarily information that is verified or confirmed electronically (although it can be), but rather something that is verifiable/confirmable by a user without the use of an electronic device. For example, in the present example embodiment, the physical authentication information is simply two short strings, one for each user, that the users can communicate to each other to verify that they are the people who have been corresponding with each other digitally. In this example, Thomas selects a token of "AAA" and Watson selects a token of "BBB." Of course, in other embodiments, a wide array of potential tokens may be used. For example, in certain embodiments, the token includes a brief, written description of what each user plans on wearing to the meeting. In other (or the same) embodiments, the physical authentication information includes a photograph or other image depicting what the corresponding user looks like— either generally or specifically recorded at the time of the meeting. In still other (or the same) embodiments, the physical authentication information is audible, such as a spoken set of word(s), a chime, or a song, for example. In yet other (or the same) embodiments, the physical authentication information is a gesture that each user agrees to perform, such as a specific type of handshake, wave, or other physical movement. Additionally, in many embodiments, the token is an ephemeral token, chosen by the respective user for the meeting, while in other embodiments the token may be reused.

Upon receiving the registration information for each of the users (e.g., via I/O mod 355), registration mod 360 stores the registration information (e.g., in storage devices 65 of FIG. 3) for later retrieval/use in subsequent operations, using various means of storage and/or encryption to ensure that proper data security policies for the information are being met.

Processing proceeds to operation S260, where geolocation mod 365 determines that the users' devices are present at the meeting time and location. As indicated above, geolocation mod 365 may use any of a wide variety of means to determine whether the users' devices are at the meeting time and location including, for example, receiving GPS coordinates from each of the users' respective devices. Furthermore, while the location of the users' devices may be determined substantially concurrently, that is not necessarily always the case. In some embodiments, for example, the respective locations of the users' devices are determined separately, at different times, without any reliance or dependence on each other. For example, in the present embodiment, geolocation mod 365 determines that Thomas arrives within 30 feet of Conference Room A at 2:58 PM on the agreed-upon date, and Watson arrives within 30 feet of Conference Room B at 3:14 PM on the agreed-upon date. In both cases, the devices of the respective users have been determined to be at the meeting location at the meeting time, and as such processing of program 300 proceeds for each of them to operation S265 as follows.

Processing proceeds to operation S265, where, in response to determining that each user's respective device is present at the meeting location at the meeting time, I/O mod 355 sends, to each user, the other user's communications identifier and token. In the present embodiment, for example, I/O mod 355 sends to Thomas' mobile communications device (i.e., device 54A) Watson's Bluetooth™ ID and token (BBB). Similarly, I/O mod 355 sends to Watson's mobile communications device Thomas' Bluetooth™ ID and token (AAA). This enables Thomas and Watson to digitally connect and authenticate their devices via their respective Bluetooth™ IDs, and to physically/visually authenticate who they are by displaying or sending the other user's respective token. To that end, in some embodiments, I/O mod 355 also sends instructions to Tomas and Watson's respective devices, instructing Thomas and Watson to perform the aforementioned digital and physical/visual authentication.

It should again be noted that, generally speaking, the digital authentication information (e.g., a Bluetooth™ ID) is intended to be used to electronically authenticate the identities of the respective users, while the physical authentication information (i.e., the token) is intended to allow the users themselves to authenticate the identities of each other on their own, even if an electronic device happens to be used to display, send, or otherwise communicate the token. In some embodiments, the digital authentication information is information that the users possess (sometimes referred to as "ownership factors" or "inherence factors"), such as characteristics of their mobile communications devices, or various types of biometric information, while the physical authentication information is information that the users know (sometimes referred to as "knowledge factors") and can confirm based on visual or audio observation, for example. By requiring the users to provide both types of authentication information at registration—and ultimately requiring both types of authentication information to be exchanged between the users—embodiments of the present invention can provide a high degree of confidence that users who have corresponded digitally are, in fact, who they say they are in the "real world." It should also be noted that additional authentication information, such as additional digital authentication information, additional physical authentication information, and/or additional combinations/hybrids of digital and physical authentical information, may also be used in various embodiments.

It should also be noted that the sending of the respective communications identifiers and tokens to each user in operation S265 may occur substantially concurrently, once geolocation mod 365 determines that both users are present at the meeting time and location, or each individual sending may happen separately, in response to each individual user arriving at the meeting time and location. For example, in the present embodiment, I/O mod 355 sends the Bluetooth™ ID of Watson's mobile communications device, and Watson's token (BBB), to Thomas' mobile communications device (i.e., device 54A) at 2:58 PM, upon determining that Thomas' device has arrived at the meeting location at the meeting time. Similarly, I/O mod 355 sends the Bluetooth™ ID of Thomas' mobile communications device (i.e., device 54A), and Thomas' token (AAA), to Watson's mobile communications device at 3:14 PM, upon determining that Watson's device has arrived at the meeting location at the meeting time.

Referring now to flowchart 450, processing begins at operation S455, where I/O mod 555 of device 54A registers with the authentication system (i.e., program 300) for the in-person meeting. In the present example embodiment, the registration is initiated by an app on device 54A, where the app is the aforementioned client authentication app configured to communicate with both program 300 and the corresponding client authentication apps on other user devices (not shown). In this case, Thomas connects with Watson via the client authentication apps on their respective devices and they both decide to register for the in-person meeting, as discussed above. The requests generally include the meeting information and user information discussed above—that is, the request from program 500 on device 54A (Thomas' device) and the request from Watson's device each include identical, agreed-upon meeting information, while each of Thomas' device and Watson's device provide their own respective user information, including their respective Bluetooth™ IDs and tokens.

Processing proceeds to operation S460, where I/O mod 555 notifies the authentication system (i.e., program 300) that device 54A has arrived at the meeting location at the meeting time, within the agreed-upon variances. For example, device 54A uses geolocation mod 560 of device 54A to determine approximate GPS coordinates, or another suitable measurement of location, and device 54A uses its system clock to determine the approximate time. In the present example, when Thomas arrives within 30 feet of Conference Room A at 2:58 PM, geolocation mod 560 determines that device 54A is present at the meeting location and the meeting time, and I/O mod 555 communicates the details of that determination to the authentication system.

Processing proceeds to operation S465, where I/O mod 555 receives the other user's communications identifier and token for authentication. As described above, in the present example, I/O mod 555 on device 54A (Thomas' device) receives, from program 300 of the authentication system, the Bluetooth™ ID for Watson's device along with Watson's token (BBB).

Processing proceeds to operation S470, where authentication mod 565 authenticates the other user's device using the communications identifier. While various other communications identifiers and digital authentication information and methods are discussed both above and below, in the present example embodiment, authentication mod 565 uses the received Bluetooth™ ID for Watson's device to find Watson's device and initiate a communications handshake for a first level of authentication (i.e., digital authentication).

Processing then proceeds to operation S475, where, in response to a successful authentication using the received communications identifier, I/O mod 555 of device 54A communicates the received token to the other device, allowing the user of the other device to confirm their token and complete a second level of authentication (i.e., physical/visual authentication). Any of a wide variety of methods for data communication may be used (see, for example, the Definitions sub-section of this Detailed Description). In the case of the present example embodiment, I/O mod 555 uses the communications channel that was opened using the received communications identifier to send the received token—that is, I/O mod 555 uses the Bluetooth™ connection that was opened between Thomas' device and Watson's device during authentication to send Watson's token to Watson's device, thereby allowing Watson to view and confirm Watson's token. In other embodiments, the token is communicated via other means, such as via other communications channels (NFC, infrared, etc.) or by displaying the token on the user's device so that it is in visual range of the other user (i.e., the user who can confirm that the token is their token).

It should be noted that in some cases, the authentication of operation S470 and the communication of operation S475 happen automatically, triggered by program 500 in response to receiving the communications identifier and token. In other embodiments, however, the authentication of operation S470 and the communication of operation S475 occur in response to instructions received from the authentication system. For example, in some embodiments, the instructions received from the authentication system are displayed to the user of device 54A (e.g., Thomas), prompting the user to manually initiate one or both of the authentication of operation S470 and the communication of operation S475.

The preceding paragraphs describe several examples of ways that communications identifiers (digital authentication information) and tokens (physical authentication information) can be used to provide multiple levels of authentication for an in-person meeting. It should again be noted that the discussion of the present example embodiment is provided for example purposes, and is not necessarily meant to be limiting. In other embodiments, for example, additional measures can be taken to authenticate with an even higher degree of confidence. For example, in some embodiments, the token is paired with, or appended to, an image depicting the non-receiving user (i.e., the user not associated with the token), making it easier for the receiving user to identify the non-receiving user in a crowd. The image can be provided by the respective user—for example, using camera mod 570 of program 500—and in some cases can be provided to the authentication system for further processing—for example, by a Generative Adversarial Network (GAN) of image processing mod 370 of program 300—to minimize the risk of fraud by providing an additional level of computational complexity. Still further, in certain embodiments, the processed image can be encrypted using a public key of the eventual recipient, allowing for an additional level of authentication while also securing the recipient's token from view, even to the sender. Several of these embodiments are discussed in detail in the following sub-section of this Detailed Description.

III. Further Comments and/or Embodiments

Some embodiments of the present invention recognize the following facts, potential problems and/or potential areas for improvement with respect to the current state of the art: (i) existing methods for in-person authentication are typically one-way, allowing for one person in a meeting to authenticate their identity but not allowing for symmetrical/mutual authentication of multiple people—for example, a person holding a sign as a way of uniquely identifying themselves has no way of knowing whether the person reacting to the sign is the intended person; (ii) existing methods for two-factor authentication require multiple communications and/or multiple objects to be delivered, as opposed to transmitting a single, unitary object with multiple embedded authentication elements; (iii) existing methods for authenticating parties in an ecommerce transaction include online (e.g., cloud) authentication but do not include in-person or point-to-point (e.g., peer-to-peer) authentication; and/or (iv) existing methods for authenticating multiple parties typically require a trusted $3^{rd}$ party.

Some embodiments of the present invention may include one, or more, of the following features, characteristics and/or advantages: (i) using Bluetooth™ addresses of mobile devices plus X.509 certificates to mutually authenticate identities of individuals in an in-person meeting; (ii) using facial recognition features of mobile devices to assist with authentication; (iii) establishing secure contacts between unknown persons within a certain distance based on pre-authentication using X.509 key exchange and on embedding tokens into digital photographs using Generative adversarial networks (GANs); (iv) transmitting multiple authentication elements as a single, unitary object in an encrypted fashion using a local transmission method (e.g., Bluetooth™, NFC, infrared, etc.); (v) using GANs to increase entropy, for example, by making a facsimile of a digital photograph; (vi) combining a GAN with a time limitation to provide even more security; (vii) combining/entangling a visual identifier with an ephemeral token, and encrypting the result with a public key, to ensure that only someone with the corresponding private key can decrypt, and to ensure that the object once decrypted includes both the token and the visual identifier; and/or (viii) authenticating the identities of multiple parties in a transaction/meeting without requiring a trusted $3^{rd}$ party (i.e., a trust-no-one (TNO) method).

In an embodiment, Person A wants to meet person B at a public location such as a shopping mall. In this embodiment, Person A and Person B have not previously met, and neither Person A nor Person B knows what the other person looks like. In an example, Person A is a traveler, and Person B is a person assigned to pick Person A up from an airport or train station. Or, in another example, Person A is an online purchaser of a product from Person B, and Person A and Person B plan to meet in a public place so that Person A can pick up the purchased product. In both cases, Person A and Person B wish to authenticate each other's identities upon meeting.

Certain embodiments of the present invention provide a secure, multi-level method for providing such authentication—that is, the mutual authentication of identities of parties who do not know each other. In various embodiments, the method uses unique identifiers such as a Bluetooth™ address and/or an X.509 certificate to establish a secure contact between the parties within a limited location. The method further uses limited-purpose facial recognition capabilities and a Generative adversarial network (GAN) framework to help the parties visually identify each other.

For example, in one use case, each person (e.g., Person A and Person B) takes a digital photograph of themselves (i.e., a "selfie") and sends the digital photograph to an encoding service, where the encoding service uses a GAN to convert the digital photograph into a pseudorealistic portrait image (e.g., in Exif format) and embeds the person's public key into the portrait image. The resulting portrait image with the embedded public key can then be shared with the other person for mutual authentication.

Diagram 600, which includes an example of such digital photograph conversion, according to some embodiments of the present invention, can be found in FIG. 8. As shown in FIG. 8, digital photograph 602 is a "selfie" image of a user (e.g., Person A), provided by the user for the purpose of helping another user (e.g., Person B) to identify the user. A GAN framework receives digital photograph 602 as input and generates portrait image 604 as output. As shown, in addition to creating a reasonably accurate facsimile of the user's face, the GAN framework uses various image recognition techniques to extract visual attributes from digital photograph 602, such as the user's clothing, and adds those attributes to portrait image 604.

Figure 9:
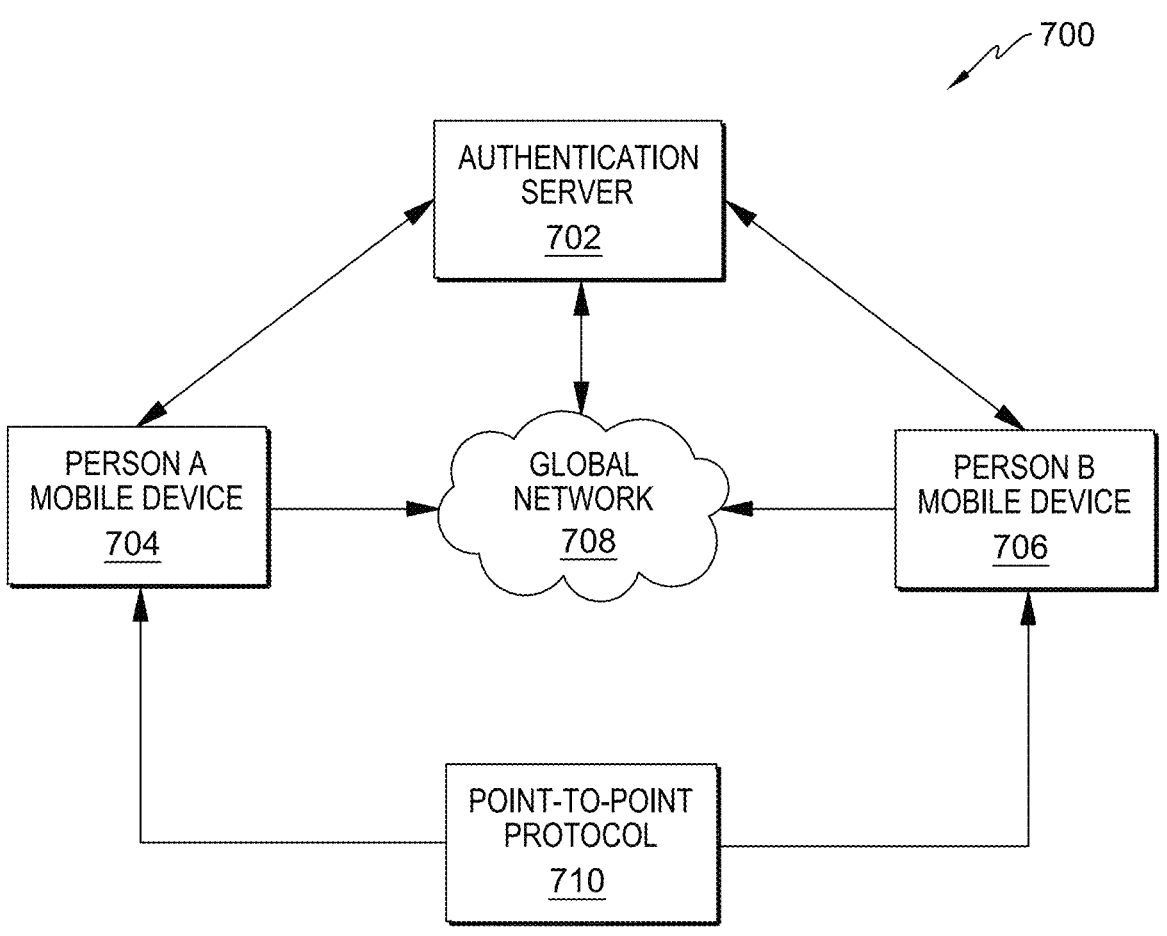
FIG. 9 is a diagram of a system, according to some embodiments of the present invention.

FIG. 9 is a diagram depicting system 700 according to some embodiments of the present invention. In an embodiment, two users, Person A and Person B, each use their respective mobile devices (Person A mobile device 704 and Person B mobile device 706) to register with authentication server 702, either directly or via global network 708. As a result, mobile device 704 and mobile device 706 are assigned respective X.509 security certificates by authentication server 702. When Person A and Person B agree to meet each other, Person A and Person B each use the public key associated with the other person's X.509 certificate to send the Bluetooth™ address of their respective device to the other person, for example, by using authentication server 702 via global network 708. As an example, in this embodiment, Person A uses Person B's public key to encrypt the Bluetooth™ address of Person A mobile device 704, and sends the encrypted Bluetooth™ address of mobile device 704 to Person B via global network 708 and/or authentication server 702. Similarly, Person B uses Person A's public key to encrypt the Bluetooth™ address of Person B mobile device 706, and then sends the encrypted Bluetooth™ address of mobile device 706 to Person B, again via global network 708 and/or authentication server 702.

Continuing this embodiment, when Person A mobile device 704 and Person B mobile device 706 are within close enough range of each other, they see each other's respective Bluetooth™ address using standard Bluetooth™ visibility functionality, for example. Then, the devices use the visible Bluetooth™ addresses and the received encrypted Bluetooth™ addresses to perform mutual public key authentication. If the Bluetooth™ addresses match—that is, if the visible Bluetooth™ address and the received encrypted Bluetooth™ address for each device match—then mutual authentication passes.

Still continuing with this embodiment, once mutual authentication passes, the devices once again use each other's public key, this time to send and receive images of each person. In this embodiment, Person A and Person B have agreed to the limited use of facial recognition technology to confirm each other's respective identities. As such, when an image is received by mobile device 704 or mobile device 706, that mobile device uses its facial recognition capabilities to identify whether the image and the person who sent the image are the same person. For example, Person A encrypts an image of Person A using Person B's public key, and sends the encrypted image to Person B mobile device 706 using point-to-point protocol 710. Person B then uses Person B mobile device 706 to take a digital photograph of the person alleging to be Person A in person. Person B mobile device 706 then applies facial recognition technology to the digital photograph of the person alleging to be Person A to identify whether the person alleging to be Person A is the same person as in the received encrypted image of Person A.

In another embodiment, two users (Person A and Person B) register their respective X.509 security certificates with authentication server 702. In this embodiment, Person A and Person B agree to meet at a given time and location, with each user providing a respective ephemeral token, or codeword, to help authenticate their identity. Each user's token is communicated to authentication server 702 independently, and is held in escrow by authentication server 702 and not immediately disclosed to the other user. In various embodiments, the token may include additional characteristics, such as a specific color or font, to further help in providing authentication.

When Person A and Person B arrive in the vicinity of the agreed-upon location near the agreed-upon time, they are each prompted to take digital photographs of themselves using their respective mobile devices (Person A mobile device 704 and Person B mobile device 706). The digital photographs, once taken, are sent to authentication server 702, where they are each processed through a GAN, appended with the token of the receiving user, and encrypted with the public key associated with the security certificate of the receiving user. In this embodiment, the authentication server 702 then releases the Bluetooth™ address of the sending user, encrypted in the receiving user's public key, to the receiving user, and releases the processed digital photograph back to the sending user. Once the users perform mutual authentication based on Bluetooth™ address, as discussed above, the users then exchange their respective processed digital photographs via local methods, such as via Bluetooth™, NFC, and/or infrared beam. Upon receiving a processed digital photograph, a user will be able to recognize the other user from the photograph, as well as their own token superimposed in the photograph.

Figure 10:
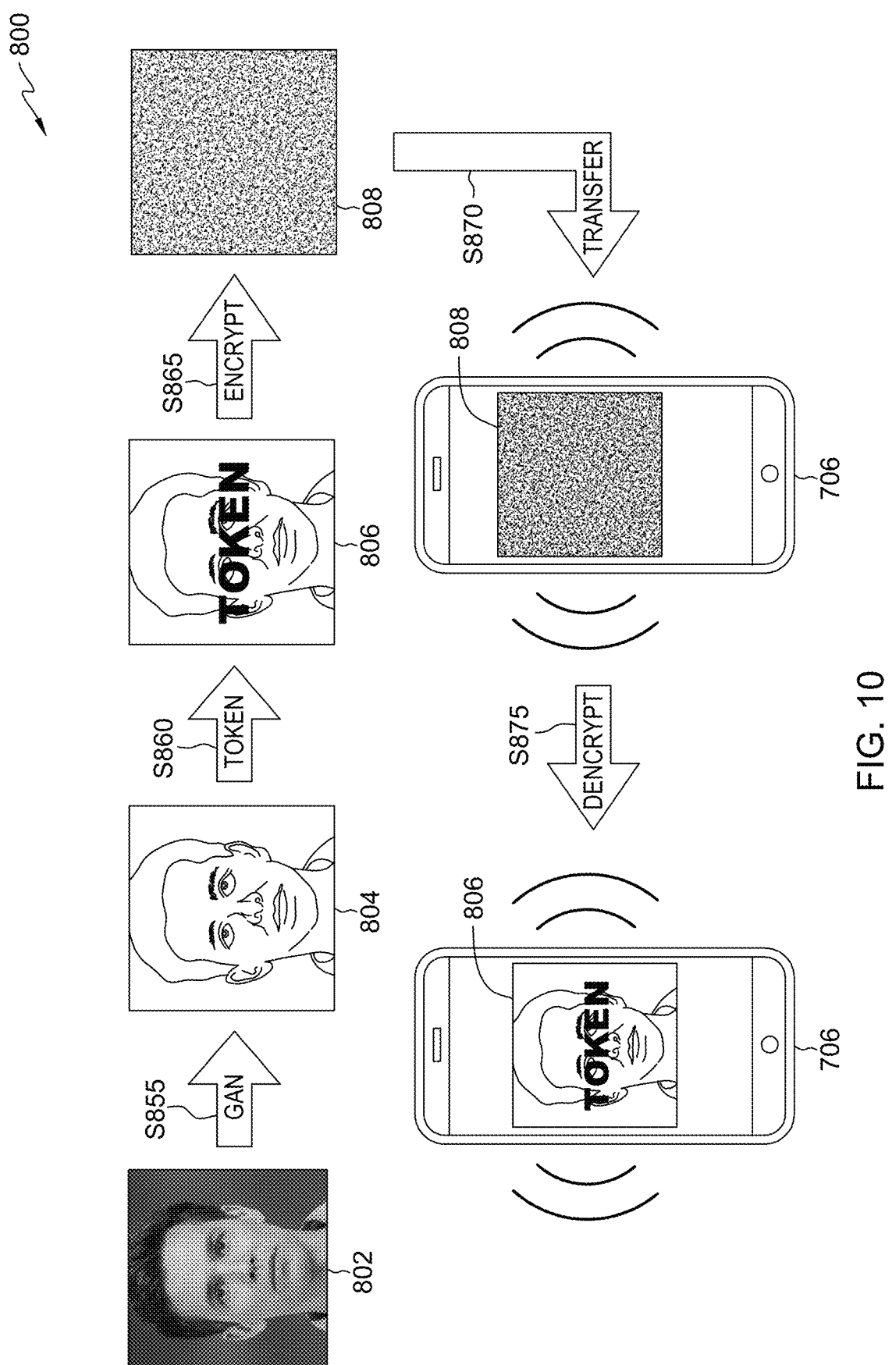
FIG. 10 is a diagram depicting the processing of a digital photograph, according to some embodiments of the present invention.

FIG. 10 is a diagram depicting process flow 800, including an example of a digital photograph as it is processed through a GAN, appended with a token, and ultimately provided to a user, in accordance with some embodiments of the present invention. In this embodiment, Person A uses a mobile device (e.g., Person A mobile device 704) to take digital photograph 802. Digital photograph 802 is processed (S855) through a GAN, resulting in portrait image 804. Portrait image 804 is then appended (S860) with a token for Person B (the eventual recipient), resulting in appended portrait image 806. Appended portrait image 806 is then encrypted (S865) using the public key for Person B's X.509 security certificate, resulting in encrypted portrait 808. Encrypted portrait 808 is transferred (S870) to Person B's mobile device 706, and Person B's mobile device 706 uses the private key for Person B's X.509 security certificate to decrypt (S875) the encrypted portrait, resulting in a decrypted copy of appended portrait image 806 on Person B's mobile device 706. Person B can use appended portrait image 806 to identify Person A, and can validate the provenance of appended portrait image 806 by identifying Person B's own token appended to the image.

In various embodiments, methods of the disclosed embodiments are implemented as a cloud service (e.g., SaaS) operating on one or more servers (e.g., on authentication server 702). In various embodiments, the one or more servers provide the following functionality: (i) user registration and authentication; (ii) establishing user sessions, identifying and maintaining user meeting artifacts (e.g., session tokens, images, certificates, Bluetooth™ addresses/identifiers, location data, meeting date/time attributes, etc.); (iii) providing security certificates (such as X.509 certificates), public key validation, and public key exchange; (iv) receiving digital photographs from users and processing the digital photographs using a GAN framework, transforming the digital photographs into pseudorealistic portrait images; (v) embedding images with session tokens; (vi) performing image recognition for identifying additional visual appearance attributes from received digital photographs; and/or (vii) establishing secure ad-hoc connections between users.

In various embodiments, client-side components (e.g., Person A mobile device 704 and/or Person B mobile device 706) provide the following functionality: (i) performing user login and establishing a connection with the cloud service; (ii) identifying meeting data: location, date/time, contact info of other user; (iii) sending/receiving X.509 certificates; (iv) using a public key associated with an X.509 certificate to perform mutual public key authentication via direct contact means such as instant message and/or email; (v) upon arriving at a meeting location at a designated time, taking a digital photograph of a user and processing the image via a request to a GAN framework; (vi) receiving a session token from the cloud service and encrypting a portrait image with the token using a public key; (vii) receiving a Bluetooth™ address/identifier from the cloud service and establishing a local connection (e.g., Bluetooth™, NFC, Infrared beam) with a device associated with the Bluetooth™ address/identifier; (viii) exchanging encrypted portraits; (ix) decrypting received portrait images using a private key associated with a security certificate; and/or (x) presenting to the user the decrypted portrait image with the embedded session token.

Certain embodiments of the present invention provide a method for authenticating the identities of strangers for an in-person meeting. The method includes: identifying that a first user and a second user have agreed to meet in-person at a given time and location; receiving, from both the first user and the second user, respective security keys and tokens (e.g., codewords); in response to the first user arriving in the vicinity of the given location at the given time, requesting the first user to take a digital image (e.g., a selfie) of themselves; and in response to receiving the digital image of the first user from the first user, performing the following: (i) processing the digital image through a generative adversarial network (GAN), (ii) adding the second user's token as a watermark to the processed image, (iii) encrypting the watermarked and processed image using the second user's security key, and (iv) sending the encrypted, watermarked, and processed image to the first user for sharing with the second user over a local connection (e.g., Bluetooth™, NFC, infrared beam). In various embodiments, the method also includes repeating the requesting and the performing for the second user.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User: includes, but is not necessarily limited to, the following: (i) a single individual human; (ii) an artificial intelligence entity with sufficient intelligence to act as a user; and/or (iii) a group of related users.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:

storing, by an authentication system, information relating to a planned in-person meeting between a first user and a second user, the information including a meeting time, a meeting location, and, for the first user and the second user: (i) a communications identifier associated with a device of the respective user, and (ii) a token identifiable by the respective user for authenticating another user of the planned in-person meeting, wherein the token is combined with an image of the another user recorded within a predetermined time period of the meeting time and encrypted with a respective public key;

in response to receiving, by the authentication system, a first indication that the device of the first user is located within a predetermined distance of the meeting location within the predetermined time period of the meeting time, sending, by the authentication system, information utilized in multi-factor authentication of the second user to the device of the first user over a secure communication channel: (i) the communications identifier associated with the device of the second user, and (ii) the token identifiable by the second user for the meeting, wherein the token identifiable by the second user is decrypted by the first user using a first private key corresponding to a first public key associated with the second user-embedded to an image of the first user recorded near the meeting time to identify the first user using a generative adversarial network, and the identification of the first user utilizes a facial recognition to match an image of the first user to the first user; and in response to receiving, by the authentication system, a second indication that the device of the second user is located within the predetermined distance of the meeting location within the predetermined time period of the meeting time, sending, by the authentication system, information utilized in multi-factor authentication of the first user to the device of the second user over the secure communication channel: (i) the communications identifier associated with the device of the first user, and (ii) the token identifiable-identified by the first user for the meeting, wherein the token identifiable by the first user is decrypted by the second user using a second private key corresponding to a second public key associated with the first user, and the identification of the second user utilizes a facial recognition to match an image of the second user to the second user, wherein:

the token identifiable by the second user for the meeting is verified by the second user upon subsequent electronic communication from the first user to the second user; and the token identifiable by the first user for the meeting is verified by the first user upon subsequent electronic communication from the second user to the first user.

2. The computer-implemented method of claim 1, wherein:

sending, to the device of the first user, the token identifiable by the second user for the meeting includes sending, to the device of the first user, a digital portrait of the first user with the token identifiable by the second user for the meeting embedded to the digital portrait of the first user; and sending, to the device of the second user, the token identifiable by the first user for the meeting includes sending, to the device of the second user, a digital portrait of the second user with the token identifiable by the first user for the meeting embedded to the digital portrait of the second user.

3. The computer-implemented method of claim 2, further comprising:

sending, to the device of the first user, first instructions to send the digital portrait of the first user with the embedded token identifiable by the second user to the device of the second user utilizing the communications identifier associated with the device of the second user; and sending, to the device of the second user, second instructions to send the digital portrait of the second user with the embedded token identifiable by the first user to the device of the first user utilizing the communications identifier associated with the device of the first user.

4. The computer-implemented method of claim 3, wherein:

the first instructions further include instructions to authenticate the identity of the second user using the first public key associated with the second user; and the second instructions further include instructions to authenticate the identity of the first user using the second public key associated with the first user.

5. The computer-implemented method of claim 4, further comprising:

encrypting the digital portrait of the first user with the embedded token identifiable by the second user utilizing the first public key associated with the second user; and encrypting the digital portrait of the second user with the embedded token identifiable by the second user utilizing the second public key associated with the first user.

6. The computer-implemented method of claim 3, further comprising:

in response to receiving a digital photograph of the first user from the device of the first user, encoding the digital photograph of the first user into the digital portrait of the first user utilizing a generative adversarial network that converts the digital photograph into the digital portrait that includes a pseudorealistic portrait image; and in response to receiving a digital photograph of the second user from the device of the second user, encoding the digital photograph of the second user into the digital portrait of the second user utilizing the generative adversarial network.

7. The computer-implemented method of claim 1, wherein the communications identifier associated with the device of the first user and the communications identifier associated with the device of the second user are Bluetooth addresses.

8. A computer program product comprising one or more computer readable storage media and program instructions collectively stored on the one or more computer readable storage media, the stored program instructions comprising:

program instructions to store, by an authentication system, information relating to a planned in-person meeting between a first user and a second user, the information including a meeting time, a meeting location, and, for the first user and the second user: (i) a communications identifier associated with a device of the respective user, and (ii) a token identifiable by the respective user for authenticating another user of the planned in-person meeting, wherein the token is combined with an image of the another user recorded within a predetermined time period of the meeting time and encrypted with a respective public key;

program instructions to, in response to receiving, by the authentication system, a first indication that the device of the first user is located within a predetermined distance of the meeting location within the predetermined time period of the meeting time, send, by the authentication system, information utilized in multi-factor authentication of the second user to the device of the first user over a secure communication channel: (i) the communications identifier associated with the device of the second user, and (ii) the token identifiable by the second user for the meeting, wherein the the token identifiable by the second user is decrypted by the first user using a first private key corresponding to a first public key associated with the second user, and the identification of the first user utilizes a facial recognition to match an image of the first user to the first user; and program instructions to, in response to receiving, by the authentication system, a second indication that the device of the second user is located within the predetermined distance of the meeting location within the predetermined time period of the meeting time, send, by the authentication system, information utilized in multi-factor authentication of the first user to the device of the second user over the secure communication channel: (i) the communications identifier associated with the device of the first user, and (ii) the token identifiable-identified by the first user for the meeting, wherein the token is associated with a physical or visual in person identification of the first user and the token identifiable by the first user is decrypted by the second user using a second private key corresponding to a second public key associated with the first user, and the identification of the second user utilizes a facial recognition to match an image of the second user to the second user, wherein:

the token identifiable by the second user for the meeting is verified by the second user upon subsequent electronic communication from the first user to the second user; and the token identifiable by the first user for the meeting is verified by the first user upon subsequent electronic communication from the second user to the first user.

9. The computer program product of claim 8, wherein:

sending, to the device of the first user, the token identifiable by the second user for the meeting includes sending, to the device of the first user, a digital portrait of the first user with the token identifiable by the second user for the meeting embedded to the digital portrait of the first user; and sending, to the device of the second user, the token identifiable by the first user for the meeting includes sending, to the device of the second user, a digital portrait of the second user with the token identifiable by the first user for the meeting embedded to the digital portrait of the second user.

10. The computer program product of claim 9, the stored program instructions further comprising:

program instructions to send, to the device of the first user, first instructions to send the digital portrait of the first user with the embedded token identifiable by the second user to the device of the second user utilizing the communications identifier associated with the device of the second user; and program instructions to send, to the device of the second user, second instructions to send the digital portrait of the second user with the embedded token identifiable by the first user to the device of the first user utilizing the communications identifier associated with the device of the first user.

11. The computer program product of claim 10, wherein:

the first instructions further include instructions to authenticate the identity of the second user using the first public key associated with the second user; and the second instructions further include instructions to authenticate the identity of the first user using the second public key associated with the first user.

12. The computer program product of claim 11, the stored program instructions further comprising:

program instructions to encrypt the digital portrait of the first user with the embedded token identifiable by the second user utilizing the second public key associated with the second user; and program instructions to encrypt the digital portrait of the second user with the embedded token identifiable by the second user utilizing the first public key associated with the first user.

13. The computer program product of claim 10, the stored program instructions further comprising:

program instructions to, in response to receiving a digital photograph of the first user from the device of the first user, encode the digital photograph of the first user into the digital portrait of the first user utilizing a generative adversarial network that converts the digital photograph into the digital portrait that includes a pseudorealistic portrait image; and program instructions to, in response to receiving a digital photograph of the second user from the device of the second user, encode the digital photograph of the second user into the digital portrait of the second user utilizing the generative adversarial network.

14. The computer program product of claim 8, wherein the communications identifier associated with the device of the first user and the communications identifier associated with the device of the second user are Bluetooth addresses.

15. A computer system comprising:

a processor set; and one or more computer readable storage media;

wherein:

the processor set is structured, located, connected and/or programmed to run program instructions stored on the one or more computer readable storage media; and the stored program instructions comprise:

program instructions to register and store, by an authentication system, information relating to a planned in-person meeting between a first user and a second user, the information including a meeting time, a meeting location, and, for the first user and the second user: (i) a communications identifier associated with a device of the respective user, and (ii) a token identifiable by the respective user for authenticating another user of the planned in-person meeting, wherein the communications identifier is a unique Bluetooth communications identifier for the device of the respective user and the token is combined with an image of the another user recorded within a predetermined time period of the meeting time and encrypted with a respective public key;

program instructions to, in response to receiving, by the authentication system, a first indication that the device of the first user is located within a predetermined distance of the meeting location within the predetermined time period of the meeting time, send, by the authentication system, information utilized in multi-factor authentication of the second user to the device of the first user over a secure communication channel: (i) the communications identifier associated with the device of the second user, and (ii) the token identifiable by the second user for the meeting, wherein the token identifiable by the second user is decrypted by the first user using a first private key corresponding to a first public key associated with the second user, and the identification of the first user utilizes a facial recognition to match an image of the first user to the first user; and program instructions to, in response to receiving, by the authentication system, a second indication that the device of the second user is located within the predetermined distance of the meeting location within the predetermined time period of the meeting time, send, by the authentication system, information utilized in multi-factor authentication of the first user to the device of the second user over the secure communication channel: (i) the communications identifier associated with the device of the first user, and (ii) the token identifiable by the first user for the meeting, wherein the token identifiable by the first user is decrypted by the second user using a second private key corresponding to a second public key associated with the first user, and the identification of the second user utilizes a facial recognition to match an image of the second user to the second user, wherein:

the token identifiable by the second user for the meeting is verified by the second user upon subsequent electronic communication from the first user to the second user; and the token identifiable by the first user for the meeting is verified by the first user upon subsequent electronic communication from the second user to the first user.

16. The computer system of claim 15, wherein:

sending, to the device of the first user, the token identifiable by the second user for the meeting includes sending, to the device of the first user, a digital portrait of the first user with the token identifiable by the second user for the meeting embedded to the digital portrait of the first user; and sending, to the device of the second user, the token identifiable by the first user for the meeting includes sending, to the device of the second user, a digital portrait of the second user with the token identifiable by the first user for the meeting embedded to the digital portrait of the second user.

17. The computer system of claim 16, the stored program instructions further comprising:

program instructions to send, to the device of the first user, first instructions to send the digital portrait of the first user with the embedded token identifiable by the second user to the device of the second user utilizing the communications identifier associated with the device of the second user; and program instructions to send, to the device of the second user, second instructions to send the digital portrait of the second user with the embedded token identifiable by the first user to the device of the first user utilizing the communications identifier associated with the device of the first user.

18. The computer system of claim 17, wherein:

the first instructions further include instructions to authenticate the identity of the second user using the first public key associated with the second user; and the second instructions further include instructions to authenticate the identity of the first user using the second public key associated with the first user.

19. The computer system of claim 18, the stored program instructions further comprising:

program instructions to encrypt the digital portrait of the first user with the embedded token identifiable by the second user utilizing the first public key associated with the second user; and program instructions to encrypt the digital portrait of the second user with the embedded token identifiable by the second user utilizing the second public key associated with the first user.

20. The computer system of claim 17, the stored program instructions further comprising:

program instructions to, in response to receiving a digital photograph of the first user from the device of the first user, encode the digital photograph of the first user into the digital portrait of the first user utilizing a generative adversarial network that converts the digital photograph into the digital portrait that includes a pseudorealistic portrait image; and program instructions to, in response to receiving a digital photograph of the second user from the device of the second user, encode the digital photograph of the second user into the digital portrait of the second user utilizing the generative adversarial network.

\* \* \* \* \*